United States Patent [19]

Press et al.

[11] Patent Number: 5,709,766
[45] Date of Patent: Jan. 20, 1998

[54] PROCESS FOR PREPARING A POLYURETHANE COATED FABRIC

[76] Inventors: Stuart Press, 42 Academy St., New Haven, Conn. 06511; Hal Hoder, 31 Country Club Dr., Woodbridge, Conn. 06525

[21] Appl. No.: 500,340

[22] Filed: Jul. 10, 1995

[51] Int. Cl.⁶ .................................................... B32B 31/26
[52] U.S. Cl. ........................ 156/307.3; 156/307.1; 156/307.7; 156/324
[58] Field of Search ............................ 156/307.1, 307.3, 156/307.7, 324, 325, 555, 580, 582, 583.1

[56] References Cited

U.S. PATENT DOCUMENTS

| | | | |
|---|---|---|---|
| 3,753,828 | 8/1973 | Manne et al. | 156/324 X |
| 4,624,877 | 11/1986 | Lea et al. | 428/71 |
| 4,994,133 | 2/1991 | Oizumi et al. | 156/270 |
| 5,057,172 | 10/1991 | Woiceshyn | 156/148 |
| 5,151,146 | 9/1992 | Green | 156/177 |
| 5,152,018 | 10/1992 | Lea | 5/420 |
| 5,238,017 | 8/1993 | Rohleder et al. | 264/25 |
| 5,282,286 | 2/1994 | MacLeish | 5/654 |
| 5,316,608 | 5/1994 | Ocampo et al. | 156/230 |

*Primary Examiner*—James Sells
*Attorney, Agent, or Firm*—Bachman & LaPointe, P.C.

[57] ABSTRACT

A process for preparing a polyurethane coated fabric includes the steps of providing a fabric; providing a sheet of polyurethane film; wiping a surface of the polyurethane film with a bonding material so as to provide the polyurethane film with a bonding material wiped surface; and laminating the polyurethane film to the fabric with the bonding material wiped surface contacting the fabric so as to provide polyurethane coated fabric.

28 Claims, 3 Drawing Sheets

PROCESS FOR PREPARING A POLYURETHANE COATED FABRIC

BACKGROUND OF THE INVENTION

The invention relates to a process for preparing a polyurethane coated fabric, especially for preparing fabrics which are useful for manufacturing inflatables, medical products and the like.

Conventionally, polyurethane fabrics have been prepared according to two methods. A first known method is known as solution coating, and is carried out by applying a solution of polyurethane and a solvent to a fabric web using a coating machine. The first coat of polyurethane is usually applied along with the addition of an isocyanate additive to promote adhesion. A typical inflatable fabric may require a total coating weight of 4.0 ounces per square yard. Conventional coating machines are typically limited to applying a coating in the amount of about 0.4–0.7 ounces per square yard per pass through the machine. Thus, in order to prepare a sufficiently coated fabric according to this process, approximately eight (8) coating steps would be required.

Another conventional process for preparing polyurethane coated fabrics is known as solution coating/laminating. This process is similar to the solution coating process described above except that after the adhesive coat and one or two intermediate coats are applied to the fabric, a preformed thermoplastic urethane film is applied with heat and pressure. Thus, with this process, several coating steps are required prior to the application of urethane films.

The conventional processes described above each require a plurality of coating steps to produce the final product. Further, stretch fabrics and fabrics of a highly textured nature which are frequently desirable in the manufacture of inflatable products do not lend themselves to solution coating. Still further, the conventional processes require relatively large amounts of adhesives which are significantly more expensive than urethane film on a per dry ounce basis.

It is apparent that a need remains for an efficient and effective process for preparing a polyurethane coated fabric.

In accordance with the foregoing, it is the primary object of the present invention to provide a process for preparing a polyurethane coated fabric which does not involve the application of a multitude of solution coatings to the fabric.

It is a further object of the present invention to provide a process for preparing a polyurethane coated fabric wherein the use of adhesives is significantly reduced or eliminated.

It is a still further object of the present invention to provide a process for preparing a polyurethane coated fabric which process is effective for use with stretch fabrics or fabrics made of a highly textured material.

Other objects and advantages of the present invention will appear herein below.

SUMMARY OF THE INVENTION

The foregoing objects and advantages are readily attained in accordance with the present invention.

According to the invention, a process is provided for preparing a polyurethane coated fabric which process comprises the steps of providing a fabric; providing a sheet of polyurethane film; wiping a surface of said polyurethane film with a bonding material so as to provide said polyurethane film with a bonding material wiped surface; and laminating said polyurethane film to said fabric with said bonding material wiped surface contacting said fabric so as to provide polyurethane coated fabric.

In further accordance with the invention, the process preferably further comprises the step of curing said polyurethane coated fabric at a temperature of between about 300° F. to about 425° F., whereby said bonding material bonds said polyurethane film to said fabric. The curing step may preferably be carried out for a period of between about 3 to about 6 minutes.

The wiping step preferably comprises the steps of providing an applicator surface coated with said bonding material, and contacting said polyurethane film with said applicator surface so as to wipe said polyurethane film with said bonding material.

In further accordance with a preferred embodiment of the invention, said applicator surface is a continuous and substantially smooth applicator surface whereby said wiping step provides a substantially uniform film of bonding material on said surface of said polyurethane film.

BRIEF DESCRIPTION OF THE DRAWINGS

A detailed description of preferred embodiments of the invention follows, with reference to the accompanying drawings, wherein.

DETAILED DESCRIPTION

Figure 1:
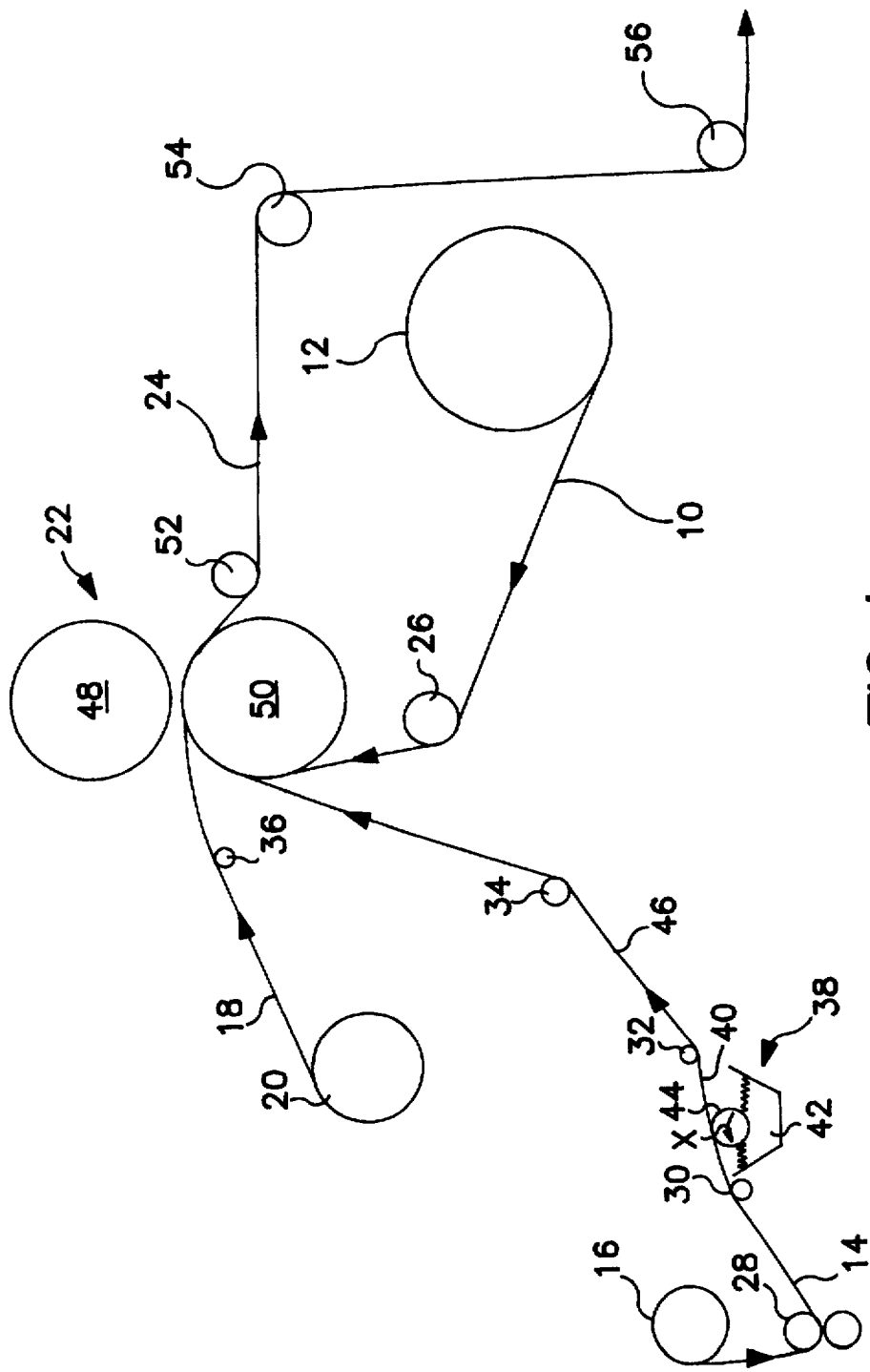
FIG. 1 is a side schematic view of a process according to the invention.

The invention relates to a process for preparing a polyurethane coated fabric, especially a polyurethane coated fabric for use in manufacturing inflatables, medical devices and the like. According to the invention, a process for providing a polyurethane coated fabric is provided which avoids multi step coating procedures and which provides simple and efficient coating of a fabric with the desired coating material.

The process of the present invention is useful for coating a wide variety of fabrics for use in preparing a wide variety of end products. Suitable fabrics for use in accordance with the invention include woven or non-woven fabrics such as stretch fabric, textured fabric, dacron, nylon, polyester, cotton, kevlar, and mixtures thereof. The process of the present invention is particularly useful with the stretch fabrics and highly textured fabrics which are frequently desired for use in manufacturing inflatable products such as air mattresses, especially self-inflating air mattresses, medical products and the like. These types of materials are not well suited for coating in accordance with the prior art processes. The present invention provides a process for coating such fabrics in a single or at least reduced number of steps, while substantially reducing or eliminating the need for expensive adhesive materials used in accordance with the prior art.

A wide variety of materials are typically used in accordance with conventional coating techniques to provide a coated fabric. A preferred material in accordance with the invention is a polyurethane film, although obviously other urethane and similar films may of course be applied. The preferred polyurethane film is provided in accordance with the present process having a thickness of between about 1 to about 20 mils. Various types and grades of polyurethane are readily available and easily selected by one skilled in the art for use in the present process, depending upon the desired characteristics of the final product.

In accordance with the invention, the bonding material which is wiped on the first film of polyurethane to be laminated may also be selected from a wide variety of materials. The bonding material is preferably a heat activated material such that the bonding material will be activated and act to bond the polyurethane film to the fabric upon the application of heat. According to the invention, the bonding material preferably comprises a solution of a bonding agent in a solvent. Preferred bonding agents includes isocyanate, melamine, epoxy, aziridene and the like. Preferred solvents include methyl ethyl ketone, dimethyl formamide, n-methyl-2-pyrrolidone, tetrahydrofuran, dimethyl sulfoxide and the like. In accordance with a preferred embodiment of the invention, the preferred bonding material is a solution of isocyanate in methyl ethyl ketone wherein the solution is between about 3% to about 10% isocyanate.

According to the invention, and as will be further described below, the bonding agent of the bonding material is preferably an agent which, upon the application of heat, becomes active and reacts with the first film of polyurethane so as to form an adhesive bond between the fabric to be coated and the polyurethane. In this manner, and also as will be described further below, one or more films of polyurethane can be directly laminated to a fabric without the multiple coating steps which are required in accordance with the prior art. Further, the bonding material of the present invention acts in conjunction with the first polyurethane film to form an adhesive bond without costly adhesive components which are used in the conventional coating processes.

Referring now to the drawings, the process of the present invention will be illustrated. According to the invention, fabric 10 is provided for coating in accordance with the present invention. Fabric 10 may be provided in individual webs or may preferably be provided in substantially continuous form, for example from a roll 12 as shown in the drawings. A first polyurethane film 14 is also provided in accordance with the invention and is preferably provided in the form of a continuous film from roll 16 as shown in the drawings. A second polyurethane film 18 may also be provided and may be provided as a continuous film from, for example, roll 20.

According to the invention, fabric 10, film 14, and film 18 are fed to a laminating station 22 wherein films 14, 18 are laminated to fabric 10 so as to provide a polyurethane coated fabric 24 in accordance with the present invention.

Fabric 10 may suitably be fed to laminating station 22 through various guide means such as bow roll 26. First film 14 may suitably be fed to laminating station 22 via nip rolls 28, bow roll 30, idler roll 32, and bow roll 34. Second film 18 may be fed to laminating station 22 by way of bow roll 36.

In order to provide the desired bonding of films 14, 18 to fabric 10 as desired in accordance with the present invention, first film 14 is fed to a bonding material applicator station 38 for wiping a side 40 of first film 14 which is subsequently contacted with fabric 10.

Bonding material applicator station 38 preferably comprises a bath of bonding material solution 42, and a substantially smooth and continuous applicator surface 44 which is preferably partially immersed in solution 42. Applicator surface 44 is preferably rotatably positioned in bonding material solution 42, and arranged for contact with side 40 of first film 14 so as to apply a substantially uniform wiping of bonding material onto side 40 of first film 14 so as to provide a wiped first film indicated at 46. As schematically illustrated by arrow X in FIG. 1, applicator surface 44 is preferably adapted to rotate so as to provide opposite motion of applicator surface 44 relative to first film 14 at the point of contact therebetween. This opposite relative motion helps to provide a smooth, continuous and substantially uniform wiping of bonding material on side 40 of first film 14 as desired in accordance with the present invention. Bow roll 30 and idler roll 32 may preferably be adjusted in accordance with the invention so as to provide the desired contact between first film 14 and applicator surface 44. As set forth above, fabric 10, wiped first film 46 and second film 18 are then preferably fed to laminating station 22, preferably with wiped first film 46 contacting fabric 10 with wiped side 40 positioned therebetween and with second film 18 positioned substantially adjacent to first film 14.

In accordance with the invention, laminating station 22 preferably comprises a set of laminating nip rollers 48, 50, for laminating and bonding first film 46 and second film 18 to fabric 10 in accordance with the invention. First laminating nip roller 48 is preferably a heated roll and provides heat for laminating films 14, 18 together and further for activating the wiped bonding material on side 40 for bonding films 14, 18 to fabric 10.

Second laminating nip roll 50 may also be heated if desired, but is preferably a cold or non-heated roll so that the texture and/or other characteristics of fabric 10 are not adversely impacted by direct contact with a heated roll.

In accordance with the invention, the temperature to which laminating nip roller 48 is heated may vary widely depending upon the specific characteristics of the materials being laminated. Typically, roller 48 is heated to a temperature of between about 330° F. to about 350° F.

From laminating station 22, polyurethane coated fabric 24 may be fed to further processing stations, examples of which will be discussed below with reference to FIGS. 2 and 3, or may be fed to a wind-up for storage for subsequent use. In this regard, polyurethane coated fabric 24 may be guided from laminating station 22, for example, by idler rolls 52, 54, 56.

Figure 2:
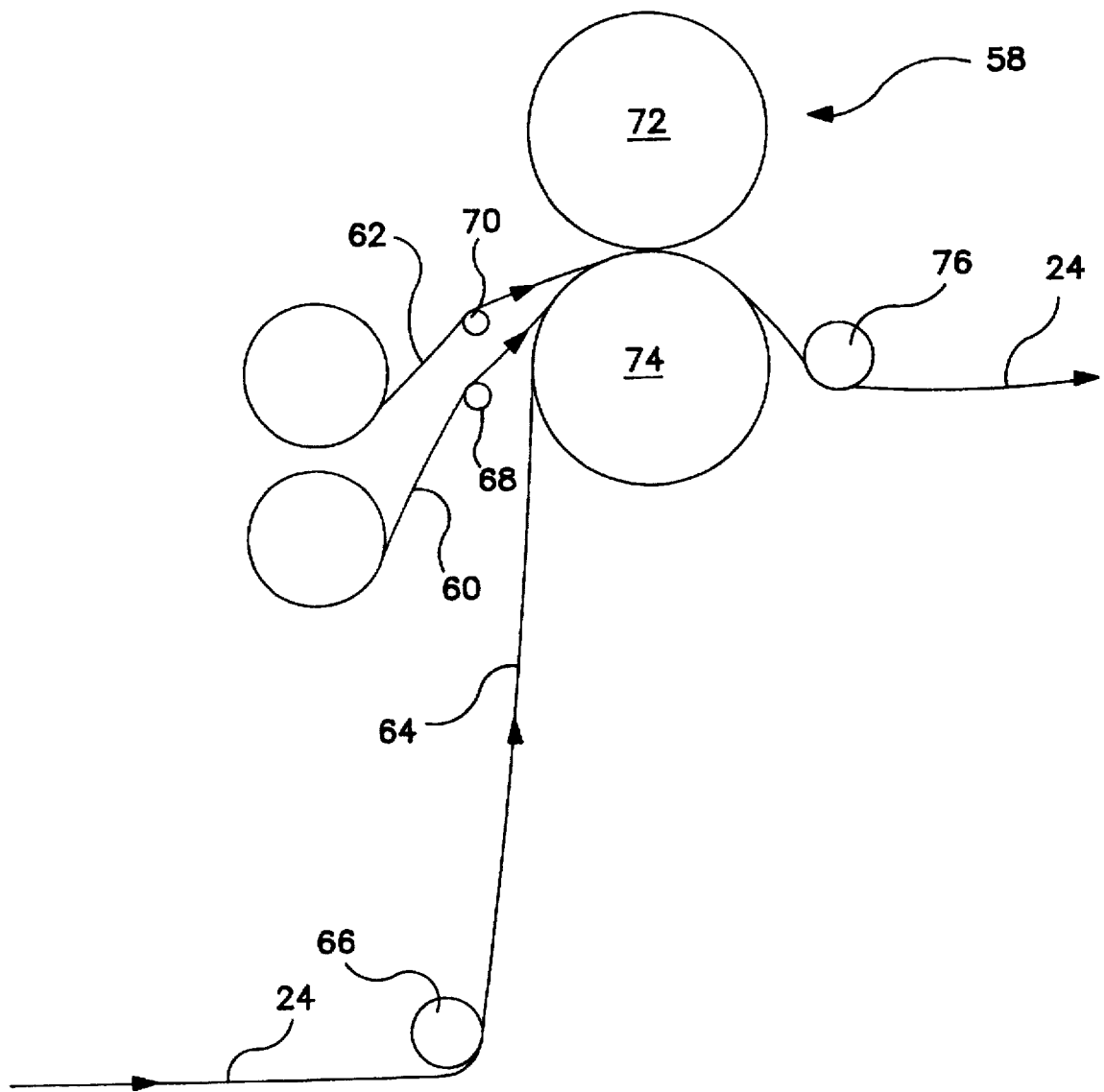
FIG. 2 is a side schematic view of an additional laminating step according to the invention.

Referring now to FIG. 2, additional polyurethane films may be applied to polyurethane coated fabric 24 if desired. FIG. 2 schematically illustrates polyurethane coated film 24 being fed in accordance with the present invention to a second laminating station 58 wherein a third polyurethane film 60 and a fourth polyurethane film 62 are to be further laminated to the film side 64 of polyurethane coated fabric 24. Polyurethane coated fabric 24 may be guided to second laminating station 58 for example by idler roll 66, while third and fourth films 60, 62 may be fed to second laminating station 58 by way of bow rolls 68, 70, respectively.

The second laminating station 58 may preferably have a heated laminating nip roll 72 and a non-heated or cold laminating nip roll 74 in a similar manner to first laminating station 22 so as to avoid undesirable smoothing of textured fabrics. Heat supplied from heated laminating nip roll 72 serves to bond and/or laminate third film 68 and fourth film 70 to each other and to the film side 64 of polyurethane coated fabric 24 as desired in accordance with the present invention.

It should be noted that third polyurethane films 14, 18, 60 and 62 may be selected and provided for laminating to fabric 10 so as to provide polyurethane coated fabric 24 with any of a wide variety of desired properties. For example, polyurethane films may be provided so as to provide polyurethane coated fabric having properties such as flame retardants, fungus resistance, long term weathering resistance, ozone resistance, humidity resistance, hydrolytic stability and the like as well as combinations of the foregoing. It should be noted that as many additional sheets or layers of polyurethane film as desired may be added to polyurethane coated fabric 24 in accordance with the invention.

Hot laminating nip roll 72 in accordance with the invention may preferably be heated to a temperature of between about 330° F. to about 375° F. so as to provide sufficient heat to bond third film 60 and fourth film 62 to polyurethane coated fabric 10 in accordance with the invention. In this regard, polyurethane films will readily bond with each other so that no wiping of these additional films is needed.

From second laminating station 58, polyurethane coated fabric 24 may be fed to further stations for additional treatment, or may be fed to wind-up or other collection means for storing the polyurethane coated fabric 24 as desired. In this regard, idler rolls 76 may be provided for guiding polyurethane coated fabric 24 as desired.

Figure 3:
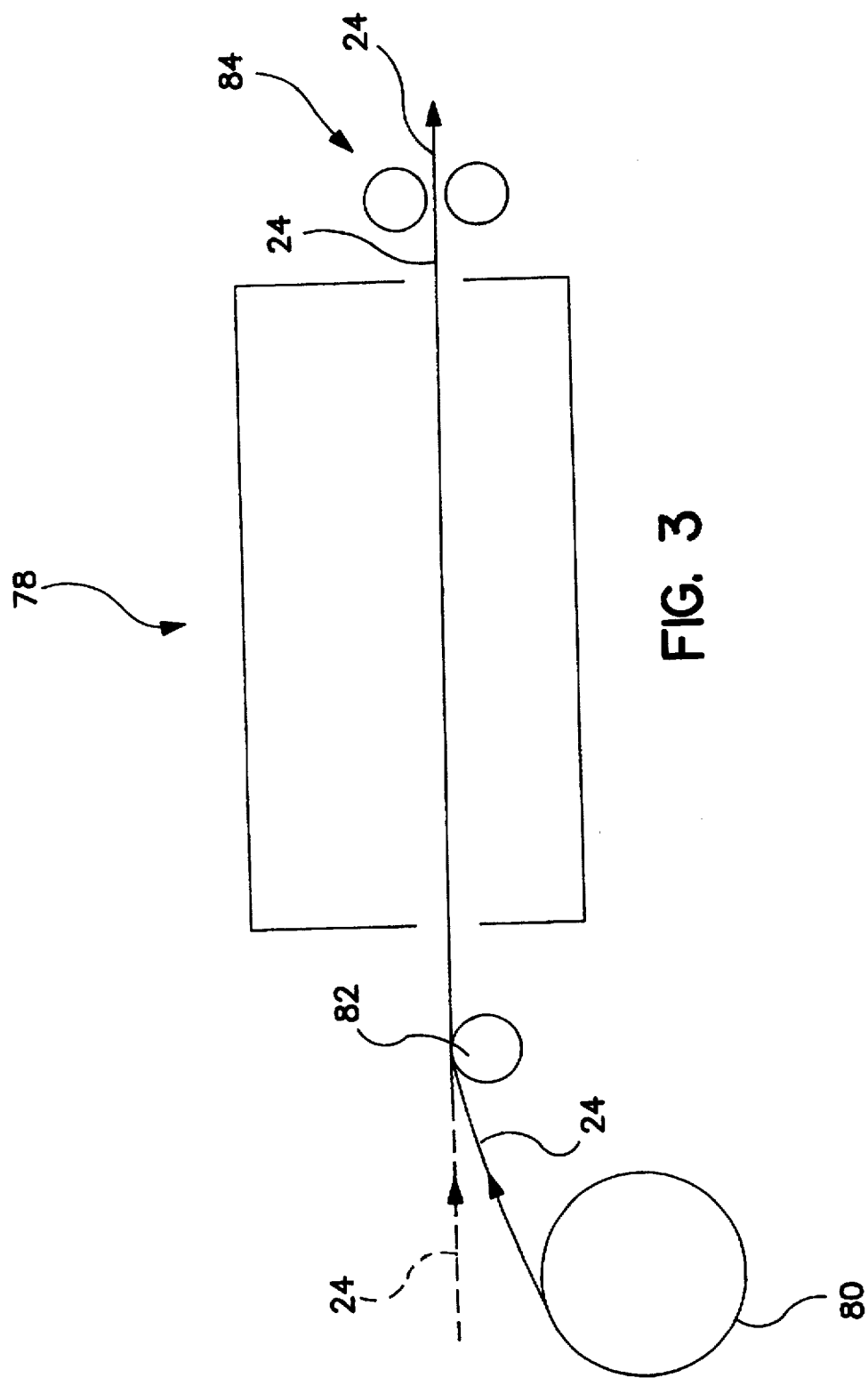
FIG. 3 is a side schematic view of the curing and embossing steps of a preferred embodiment of the invention.

Referring now to FIG. 3, polyurethane coated fabric 24 is preferably next fed to a curing station 78 for curing the adhesive bond between fabric 10 and first film 14. Polyurethane coated fabric 24 may be fed directly from first laminating station 22 or second laminating station 58 to curing station 78 as illustrated by the dashed arrows in FIG. 3. Alternatively, polyurethane coated fabric 24 may be stored in roll form as illustrated by roll 80 in FIG. 3 and subsequently fed to curing station also as shown in FIG. 3. At curing station 78, polyurethane coated fabric 24 is subjected to an increased heat, preferably a temperature of between about 300° F. to about 425° F., more preferably between about 350° F. to about 400° F., and most preferably to a temperature of between about 375° F. to about 380° F. The curing step is preferably carried out for a short period of time, preferably about 3 to about 6 minutes. During the curing step, polyurethane coated fabric 24 may preferably be kept in a laterally stretched attitude for example with tenter frame structures and the like, all as is well known to the person of ordinary skill in the art. Passing polyurethane coated fabric 24 through curing station 78 serves in accordance with the invention to cure the adhesive bond between fabric 10 and bonding material wiped first film 14. Polyurethane coated fabric 24 may suitably be fed to curing station by way of idler roll 82.

It should be noted that with some combinations of materials, curing is not necessary. However, when curing is necessary, it must generally be performed within about 12 hours of the laminating step so as to preclude undesirable bleeding of bonding material through the films and/or fabric.

From curing station 78 polyurethane coated fabric 24 may suitably be fed to an embossing station 84, if desired, for treating the film side of polyurethane coated fabric 24 so as to reduce the coefficient of friction of same. Embossing station 84 may advantageously be provided and used when a type of polyurethane film is used which has a high coefficient of friction and which therefore interferes with proper handling of polyurethane coated fabric 24 as desired. From embossing station 84, polyurethane coated film 24 may be fed to any suitable storage or use device, the specific details of which do not form a part of the present invention. For example, polyurethane coated fabric 24 may be fed to a station for forming inflatable or medical products as set forth above, or may be fed to a wind-up apparatus for forming rolls of polyurethane coated fabric 24.

Returning to FIG. 1, bonding material applicator station 38 may preferably be adapted so as to provide a specific desired amount of bonding material on polyurethane film 14 depending upon the materials to be used and the type of bond desired. The amount of bonding material applied by applicator station 38 may be modified by, for example, increasing or decreasing the relative speed between film 14 and surface 44, and modifying the tension or pressure with which film 14 and applicator surface 44 contact each other.

In accordance with the invention, the wiping step is preferably adapted so as to provide bonding material on film 14 in a concentration of between 2.6 to about 260 grams of bonding material per square yard of polyurethane film. According to a preferred embodiment of the invention, wherein a textured fabric is coated using isocyanate/methyl ethyl ketone as bonding agent, a preferred concentration of bonding material on polyurethane film 14 is about 24 grams of bonding material per square yard of polyurethane film.

In accordance with a preferred embodiment of the invention, the bonding material, as set forth above, is a solution of isocyanate in methyl ethyl ketone. In accordance with this embodiment of the invention, applicator station 38 is preferably adapted so as to provide a concentration of bonding material on film 14 so as to provide a concentration of isocyanate on film 14 of between about 0.1 to about 10 grams per square yard of polyurethane film, and so as to provide methyl ethyl ketone on film 14 in a concentration of between about 2.5 to about 250 grams of methyl ethyl ketone per square yard of polyurethane film.

In accordance with the invention, a number of additional additives may be provided as components of the polyurethane film or as additives to the bonding material solution so as to provide the final polyurethane coated fabric with various properties as desired. These additive may include stabilizers and/or anti-oxidants for polyolefins, flame retarding agents, and the like. Specific examples of additives which have been found to be useful in accordance with the invention include Stabaxol P supplied by Rhein Chemie, Trenton, N.J.; vinyzene, supplied by Morton International, Inc., Danvers, Mass.; Irganox stabilizers from Ciba-Geigy; Tinuvin stabilizers also from Ciba-Geigy; and Dechlorane plus flame retardant materials supplied by Oxidental Chemical. Of course, numerous other useful additives are well known to those skilled in the art for use in providing desired characteristics to polyurethane coated fabrics according to the invention.

The process according to the present invention produces coated fabric with high levels of coating adhesion. During the curing step, polyurethane film 14 wiped with bonding material becomes an adhesive agent to provide the desired adhesion. The present process replaces some or all of the adhesive used conventionally with a polyurethane film which is significantly less expensive than most adhesives.

The coated fabric according to the present invention is particularly well suited for the manufacture of inflatable products. Fabric 10 to be coated for use in making inflatable products may preferably be coated with films 14, 18, 60 and 62 wherein films 14, 62 are relatively low melting temperature films and films 18, 60 are relatively high melting temperature films. This configuration of films helps to prevent textured fabrics from pushing through the films during subsequent handling wherein temperatures may approach the melt temperature of low melt films 14, 62 without approaching the temperature of high melt films 18, 60. Of course, numerous other configurations may be used if desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for preparing a polyurethane coated fabric, comprising the steps of:
   providing a fabric;
   providing a sheet of polyurethane film;
   providing a bonding material comprising a bonding agent and a solvent;
   wiping a surface of said polyurethane film with said bonding material so as to provide said polyurethane film with a bonding material wiped surface; and
   laminating said polyurethane film to said fabric with said bonding material wiped surface contacting said fabric so as to provide polyurethane coated fabric whereby said bonding material reacts with said polyurethane film so as to form an adhesive bond between the fabric and the polyurethane film.

2. A process according to claim 1, wherein said bonding material is a heat activated bonding material.

3. A process according to claim 2, wherein said laminating step further includes the step of applying heat to said heat activated bonding material whereby said bonding material bonds said polyurethane film to said fabric.

4. A process according to claim 1, further comprising the step of curing said polyurethane coated fabric at a temperature of between about 300° .F to about 425° F., whereby said bonding material bonds said polyurethane film to said fabric.

5. A process according to claim 4, wherein said curing step is carried out at a temperature of between about 350° F. to about 400° F.

6. A process according to claim 4, wherein said curing step is carried out at a temperature of between about 375° F. to about 380° F.

7. A process according to claim 4, wherein said curing step is carried out for a time of between about 3 minutes to about 6 minutes.

8. A process according to claim 1, wherein said polyurethane coated fabric has a film side, and further comprising the step of embossing said film side so as to minimize a coefficient of friction of said film side.

9. A process according to claim 1, wherein said wiping step comprises the step of providing an applicator surface coated with said bonding material, and contacting said polyurethane film with said applicator surface so as to wipe said polyurethane film with said bonding material.

10. A process according to claim 9, wherein said applicator surface is a continuous and substantially smooth applicator surface whereby said wiping step provides a substantially uniform film of bonding material on said surface of said polyurethane film.

11. A process according to claim 9, wherein said wiping step further comprises the step of advancing said polyurethane film with respect to said applicator surface.

12. A process according to claim 9, wherein said step of providing said applicator surface comprises the steps of providing a roller having an outer surface as said applicator surface, at least partially immersing said roller in said bonding material, contacting said polyurethane film and said applicator surface at a point of contact, and advancing said polyurethane film relative to said roller while rotating said roller so that said roller and said polyurethane film travel in opposite directions at said point of contact.

13. A process according to claim 1, wherein said laminating step comprises the step of feeding said polyurethane film and said fabric to a laminating nip roller.

14. A process according to claim 2, wherein said laminating step and said heating step comprise the step of feeding said polyurethane film and said fabric to a heated laminating nip roller whereby said polyurethane film is laminated to said fabric, and said bonding material is activated and bonds said polyurethane film to said fabric.

15. A process according to claim 14, wherein said laminating step is carried with a laminating nip roller having at least one roller heated to a temperature of between about 330° F. to about 350° F.

16. A process according to claim 1, wherein said polyurethane coated fabric has a film side, and further comprising the step of laminating additional layers of polyurethane film to said film side of said polyurethane coated fabric.

17. A process according to claim 16, wherein said step of laminating additional layers of polyurethane film comprises the step of providing at least one additional polyurethane film, contacting said additional polyurethane film with said film side of said polyurethane coated fabric, and further laminating said additional polyurethane film to said film side of said polyurethane coated fabric.

18. A process according to claim 17, wherein said laminating step comprises the step of feeding said polyurethane film and said fabric to a laminating nip roller and wherein said further laminating step comprises the step of feeding said polyurethane coated fabric and said additional polyurethane film to an additional laminating nip roller so as to provide a polyurethane coated fabric having a plurality of layers of polyurethane film on said film side.

19. A process according to claim 18, wherein said laminating step is carried out with a laminating nip roller having at least one roller heated to a temperature of between about 330° F. to about 350° F., and wherein said further laminating step is carried out with an additional laminating nip roller having at least one roller heated to a temperature of between about 330° F. to about 375° F.

20. A process according to claim 1, wherein said fabric is selected from the group consisting of woven fabric, nonwoven fabric and mixtures thereof.

21. A process according to claim 1, wherein said fabric is selected from the group consisting of stretch fabric, textured fabric, dacron, nylon, polyester, cotton, kevlar, and mixtures thereof.

22. A process according to claim 1, further comprising the steps of continuously providing said fabric and said sheet of polyurethane film, and continuously wiping said polyurethane film and laminating said polyurethane film to said fabric, whereby said process is a continuous process.

23. A process according to claim 1, wherein said polyurethane film has a thickness of between about 1 to about 20 mils.

24. A process according to claim 1, wherein said wiping step comprises wiping said surface of said polyurethane film so as to provide bonding material on said surface of said polyurethane film in a concentration of between about 2.6 to about 260 grams of bonding material per square yard of polyurethane film.

25. A process according to claim 24, wherein said wiping step comprises wiping said surface of said polyurethane film so as to provide bonding material on said surface of said polyurethane film in a concentration of about 24 grams of bonding material per square yard of polyurethane film.

26. A process according to claim 1, wherein said bonding material is a solution of a bonding agent in a solvent, and wherein said bonding agent is selected from the group consisting of isocyanate, melamine, epoxy, aziridene and mixtures thereof, and wherein said solvent is selected from the group consisting of methyl ethyl ketone, dimethyl formamide, n-methyl-2-pyrrolidone, tetrahydrofuran, dimethyl sulfoxide and mixtures thereof.

27. A process according to claim 1, wherein said bonding material comprises a solution of isocyanate in methyl ethyl ketone.

28. A process according to claim 27, wherein said wiping step comprises wiping said surface of said polyurethane film with said solution so as to provide isocyanate on said surface of said polyurethane film in a concentration of between about 0.1 to about 10 grams of isocyanate per square yard of polyurethane film, and so as to provide methyl ethyl ketone on said surface of said polyurethane film in a concentration of between about 2.5 to about 250 grams of methyl ethyl ketone per square yard of polyurethane film.

* * * * *